United States Patent
Lennartsson et al.

(10) Patent No.: US 8,781,461 B2
(45) Date of Patent: Jul. 15, 2014

(54) METHOD OF DISTRIBUTING APPLICATION RELATED INFORMATION IN CELLULAR SYSTEM

(75) Inventors: Benny Lennartsson, Hagersten (SE); Krister Sundberg, Sollentuna (SE); Fredrik Tagt, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 653 days.

(21) Appl. No.: 12/532,046

(22) PCT Filed: Mar. 20, 2007

(86) PCT No.: PCT/SE2007/050177
§ 371 (c)(1),
(2), (4) Date: Sep. 18, 2009

(87) PCT Pub. No.: WO2008/115109
PCT Pub. Date: Sep. 25, 2008

(65) Prior Publication Data
US 2010/0048200 A1    Feb. 25, 2010

(51) Int. Cl.
H04W 24/00    (2009.01)

(52) U.S. Cl.
USPC ..................... 455/423; 455/414.1

(58) Field of Classification Search
USPC ............. 455/414–423, 550; 370/328–338; 709/221–224
See application file for complete search history.

(56) References Cited

U.S. PATENT DOCUMENTS

| | | |
|---|---|---|
| 5,835,564 A | 11/1998 | Chang et al. |
| 6,665,280 B2 | 12/2003 | Forssell et al. |
| 6,928,280 B1 | 8/2005 | Xanthos et al. |
| 7,454,210 B2 | 11/2008 | Rinne et al. |
| 2002/0138846 A1 | 9/2002 | Mizutani et al. |
| 2003/0179726 A1 | 9/2003 | Forssell et al. |
| 2003/0190915 A1 | 10/2003 | Rinne et al. |
| 2004/0132436 A1* | 7/2004 | Dupont et al. ............. 455/414.1 |
| 2007/0037570 A1* | 2/2007 | Donovan et al. ............ 455/423 |
| 2007/0105544 A1* | 5/2007 | Veres et al. ................. 455/423 |
| 2007/0123250 A1* | 5/2007 | Bond ............................ 455/423 |
| 2007/0286351 A1* | 12/2007 | Ethier et al. ............... 379/32.01 |

(Continued)

FOREIGN PATENT DOCUMENTS

| | | |
|---|---|---|
| EP | 0 898 438 A2 | 2/1999 |
| GB | 2 432 996 A | 6/2007 |

(Continued)

OTHER PUBLICATIONS

Apostolopoulos, John G., "Video Communications and Video Streaming", Streaming Media Systems Group, Hewlett-Packard Laboratories, May 1, 2001.*

(Continued)

*Primary Examiner* — Kashif Siddiqui
(74) *Attorney, Agent, or Firm* — Myers Bigel Sibley & Sajovec, P.A.

(57) ABSTRACT

In a cellular radio system a message is transmitted in the uplink from a mobile station running an application to the cellular radio system informing the radio system of the status of the application thereby enabling the operator of the radio system to collect such data for use in optimizing the planning of the radio system or as an input parameter when detecting and trouble shooting problems in the radio system network.

25 Claims, 2 Drawing Sheets

(56) References Cited

U.S. PATENT DOCUMENTS

| | | |
|---|---|---|
| 2008/0098063 A1* | 4/2008 | Huh et al. .................... 709/203 |
| 2008/0192710 A1* | 8/2008 | Balachandran et al. ...... 370/338 |
| 2009/0042578 A1 | 2/2009 | Rinne et al. |
| 2011/0153808 A1* | 6/2011 | Byun et al. ................... 709/224 |

FOREIGN PATENT DOCUMENTS

| | | |
|---|---|---|
| JP | 11-113071 A | 4/1999 |
| JP | 2002-209234 | 7/2002 |
| JP | 2004-088473 | 7/2002 |
| JP | 2002-223247 | 8/2002 |
| JP | 2004-080236 | 3/2004 |
| JP | 2005-521328 A | 7/2005 |
| WO | WO 03/081817 A1 | 10/2003 |
| WO | WO 2005/062646 A1 | 7/2005 |
| WO | WO 2007/022540 A2 | 2/2007 |

OTHER PUBLICATIONS

International Search Report dated Jan. 11, 2008 (4 pages).
First Office Action, Japanese Patent Application No. 2009-554473, Dec. 16, 2011.
Cisco, Understanding Jitter in Packet Voice Networks (Cisco IOS Platforms), printed from the internet on May 29, 2012.
Japanese Final Rejection Corresponding to Japanese Patent Application No. 2009-554473; Dated: Oct. 1, 2012; 2 Pages (Foreign Text Only).

\* cited by examiner

METHOD OF DISTRIBUTING APPLICATION RELATED INFORMATION IN CELLULAR SYSTEM

TECHNICAL FIELD

The present invention relates to a method and a device for managing radio resources in a cellular radio system.

BACKGROUND

In radio systems of today a number of different services beside speech is offered to the users of the radio network. Such additional services offered to subscribers via radio systems include services like Short Message Service SMS and MMS. Additional services have just started to emerge and users can now also subscribe to services like Music Download, Video Telephony, Mobile-TV, MBMS, and different WeShare applications.

Furthermore, for radio system planning purposes and resource management in general, it is very important for the operator of cellular radio systems to collect relevant data regarding the performance in different parts of the system and for different types of applications. Today, data relating to the performance of the radio system network is collected by drive tests performed by special test units.

However, for the new packet switched services, such as Music download or Mobile-TV, it is not possible to indicate to the network if the service session was successful or not. To exemplify, if a subscriber subscribes to a service such as progressive Music download it is important for the subscriber that the music is continuous in nature. In other words the receiving buffer should not run empty causing a disruption in the music played. Equally important is it for the operator of the radio system to be notified of such events to be able to take proper action for this not to re-occur. However, as stated above, existing radio system networks are unable to provide relevant data relating to the performance of different mobile applications in an efficient manner.

Hence, it is not possible for the operator of the radio system to monitor if the player buffer in the mobile station application did run empty, causing an interruption in the music playback.

As a result it very difficult to know when it is necessary to improve the radio network so that a service having an expected service level can be provided in all parts of a cellular radio network. At the same time it is important to be able to target those areas where the service is delivered at an expected service level to not make unnecessary investments in the radio network. It is thus important to enable the operator to make the right changes and improvements in the frequency plan to increase quality or add the number of transceivers to increase the cell capacity at the areas in need of such improvements.

Hence, there exist a need for a method and a system that can enable the operator to identify problems relating to the performance of packet switched applications in a cellular radio network in order to efficiently manage the resources of the cellular radio system network.

SUMMARY

It is an object of the present invention to overcome or at least reduce some of the problems associated with existing cellular radio networks and to provide a means whereby an operator of a cellular radio network is able to continuously monitor the performance of packet switched services in different parts of the network.

It is another object of the present invention to provide a method and a device that is capable of reporting problems in running particular application back to the operator of the network.

It is yet another object of the present invention to provide a method and a device that is capable of providing feedback of performance of an application for the operator of a cellular radio network for the operator to correctly charge for the service.

These objects and others are obtained by the method, the device and the system as set out in the appended claims. Thus, by providing a framework where a message is sent in the uplink from the mobile station running an application to the cellular radio system informing the radio system of the status of the application or if a the service is malfunctioning, the operator of the radio system can collect such data and use the data when optimizing the planning of the radio system or as an input parameter when detecting and trouble shooting problems in the radio system network.

Thus, an application performance reporting capability is introduced on the lower level nodes, i.e. the Base Station Controller (BSC) and Base Transceiver Station, BTS of for example a GSM system, thereby enabling the operators to monitor KPIs (Key Performance Indicators) and perform cell tuning on the radio network. The receiving node for this type of KPI can advantageously be the IP Multimedia Subsystem, IMS node.

Typical information included in the message transmitted back from the mobile station to the radio network includes parameters as: downloaded application data volume and parameters indicating end-user experience such as application failures/successes.

In a preferred embodiment the message is standardized so that all different mobile station applications can employ the same message to inform service status back to the system. The message information about how different services are experienced by the user will provide the operator and technicians with a tool that is very useful in terms of managing resources and trouble shooting in the network.

BRIEF DESCRIPTION OF THE DRAWINGS

The present invention will now be described in more detail by way of non-limiting examples and with reference to the accompanying drawings, in which.

DETAILED DESCRIPTION

Figure 1:
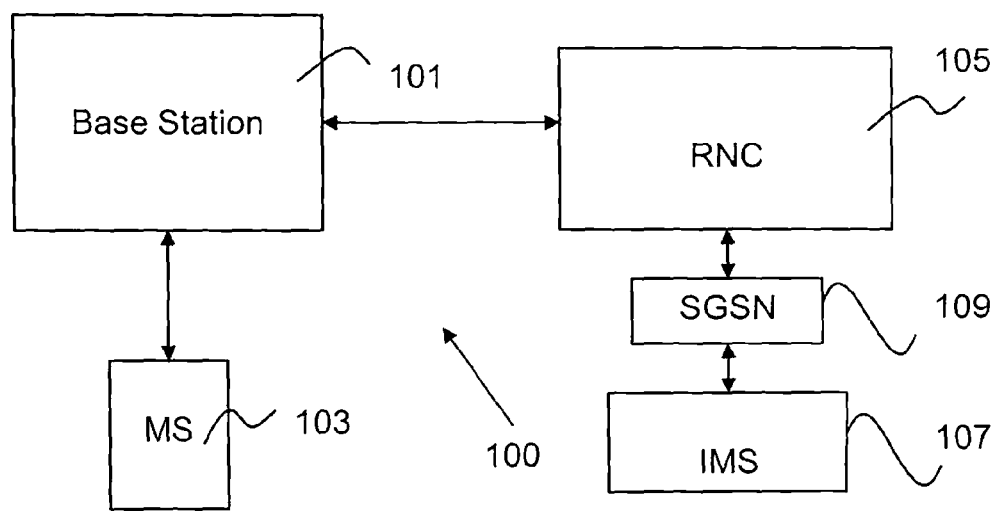
FIG. 1 is a general view of a cellular radio system

In FIG. 1 a view illustrating a cellular network 100 is shown. In the following the radio system 100 will be described as a GSM system but the invention is not limited to a GSM system, which is given as an example only. Hence, the method and device as described herein can be applied in any cellular radio network system such as a Wideband Code Division Multiple Access Network (WCDMA) or other networks.

The network 100 comprises a base station 101. The base station 101 serves a number of mobile stations MS, 103, located within the area covered by the base station 101. The base station 101 is also connected to a Base Station Controller (BSC) 105. The BSC 105 is further connected to an IP Multimedia subsystem IMS node 107 via one or many Serving GPRS Support Nodes (SGSN) 109.

In order to provide information to the operator how a specific service is working in the network the system is provided with a service performance protocol. Today, drive tests or walk tests are normally done to ensure good functionality of a service. However by using a service performance protocol as described herein, the performance of all services for every user in the network, will be continuously monitored and thus avoiding expensive drive tests and at the same time improving the quality of the input data for radio planning.

Thus, by sending a small message from the application run by the mobile station reporting the status of the data service used, the operator can be informed of problems occurring within the network.

Figure 2:
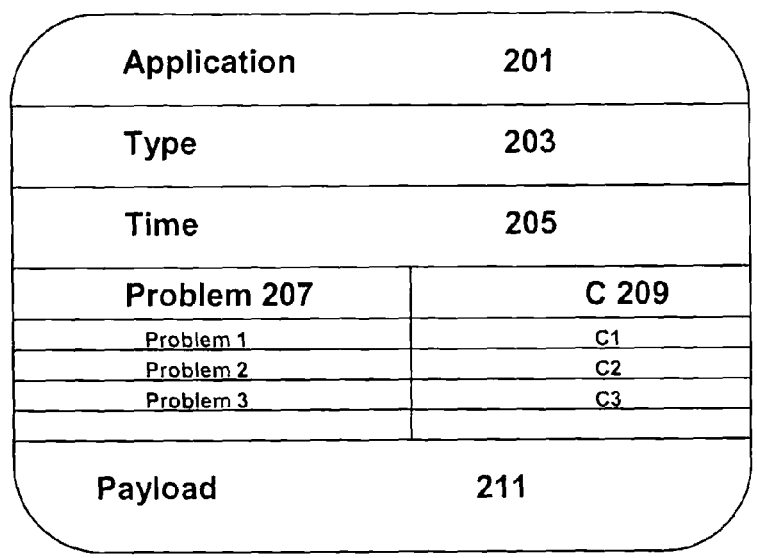
FIG. 2 is a view of a status message structure.

In FIG. 2 an exemplary structure of a status report message is depicted. The message hence comprises a number of fields each containing a pre-defined set of information. Hence, in the exemplary message structure shown in FIG. 2 the message comprises a first field 201 stating the application with which the message is associated. In a second field 203 the type of application is indicated. Examples of types are streaming data conventional or other pre-defined types. In a third field 205, timing relating to the application is indicated. Examples of timing events include events like time of transmission of the message and total download time for the application. In a fourth field 207, the message carries data relating to all problems that the application experienced, if any. In a fifth field 209, the message contains information relating to where in the network different events have occurred. For example the field 209 may contain information about the cell in which the application was initiated, in which cell(s) the application has been run, in which cell(s) the application experiences problems and in which cell the application was terminated. Finally the message can comprise a field containing information relating to the payload of the application.

In a preferred embodiment of the present invention the message is transmitted at the end of each session. In an alternative embodiment the message could be transmitted when some pre-defined event occurs. For example, the application run by the mobile station may transmit a message if the buffer runs empty when running a mobile TV session.

The message preferably contains all the information about the performance of the specific application that the operator of the network needs to minimize costs for network trouble shooting and network planning. In accordance with one embodiment of the invention the message could be placed in an LLC frame. The GPRS LLC Logical Link Control (LLC) is described in the document GSM 04.642

The message can preferably routed back to the IP Multimedia subsystem IMS node. This is beneficial because the same kind of application could exist in different systems at the same time (For example Mobile TV could be used in GSM, WCDMA, WiMAX, etc.)

Furthermore if the message is sent on an Internet Protocol (IP), level firewalls or other filters on IP level might be sensitive to this type of messages and therefore reject it.

Instead the message and the information associated therewith can be transmitted over the GPRS signaling layer. The messages may then be sent across the air interface using a frame stealing mode of transmission as described in GPRS GMM/SM GPRS Mobility Management/Session Management (GMM/SM): Mobile radio interface layer 3 specification GSM 04.082.

The information of the message providing data relating to the performance for the mobile application can also be used to provide differentiated charging of the service. For example if the service is not provided in accordance with some pre-set standard, the charge will be reduced or the session is not charged at all.

Moreover, the message can also be used to provide feedback to the operator in order to optimize and monitor the network. For example, if there is poor performance of Mobile-TV service in a specific cell with many "buffer in application running empty" then such information could form the basis for making more bandwidth available for the service in this specific cell in order to eliminate the problem.

Figure 3:
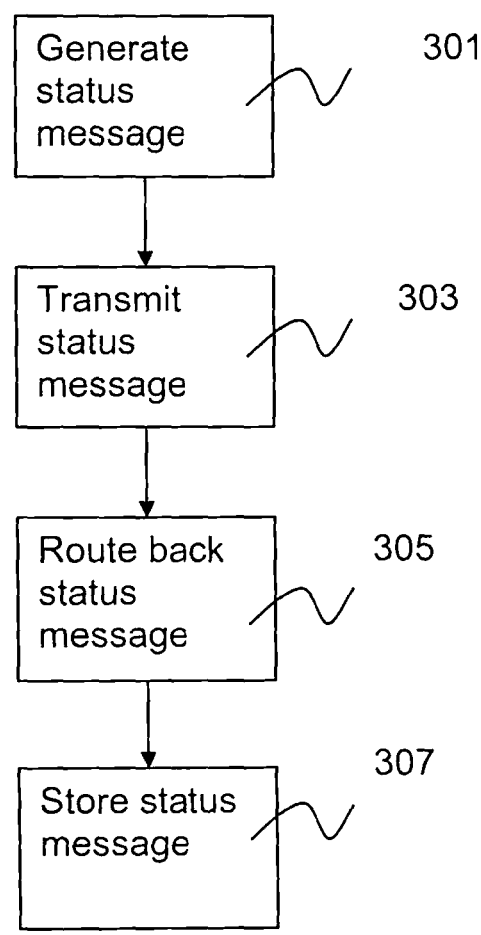
FIG. 3 is a flow chart illustrating different steps performed in a radio system network when reporting status of an application run by a mobile station.

In FIG. 3, a flow chart illustrating steps performed in a cellular network when transmitting messages indicating the service performance within the network is shown. Thus, in a first step 301 the mobile station running an application generate a message comprising information about an application run on the mobile station. As described above the message can be generated when a particular event occurs or when the application is ended or at any other suitable time. Next, the message is transmitted back to the cellular radio system to which the mobile station is connected over the air-interface, step 303. Thereupon the cellular radio system routes the message to a suitable node connected to the cellular radio system, such as the IMS node as described above, where the content of the message is stored, step 305. Finally in a step 307 the operator can access the information and use it for any suitable purpose, many of which have been described herein.

As stated above the message structure as described herein can provide application status/behavior data, from the application in the MS to the BSC, which can be collected by the network maintenance organization. This information can then be used when optimizing the network to improve the application performance. In addition the message structure can provide the Billing System with application status/behavior data, this information should be used to charge the subscriber correctly for the application usage. If streaming of music, TV or other applications is performed and interruptions in the playback, buffer runs empty, etc this should result in a lower charge for the service.

Depending on the technology used a number of different implementations can be envisaged a number of which are depicted below in table 1. The implementations in table 1 use LLC or IP as the main data transfer protocol level.

TABLE 1

Signaling layer solutions 1 to 5, using either LCC layer or IP layer.

| Solution id[1] | Layer | | Involved Nodes (final node in bold) | | |
|---|---|---|---|---|---|
| 1 | LLC | MS | BSC | | |
| 2 | LLC | MS | BSC | | Billing System |
| 3 | LLC | MS | BSC | IMS | Billing System |
| 4 | IP | MS | | IMS | Billing System |
| 5 | IP | MS | | | Any Server |

Solutions 1, 2 and 3 use the LLC layer to send the application status/behavior data from MS (application) to the relevant nodes (BSC and Billing System). The application status/behavior data can advantageously be sent following the same structure as the GPRS Mobility Management (GMM), SNDCP and SMS structure.

In solutions 1, 2 and 3 the BSC will tap the information required from the LCC layer. For example, the application status/behavior data can be sent on a new SAPI number, which the BSC is set to read.

The solution 2 and 3 will provide the application status/behavior data to the Billing System in order to enable the operator to charge the light amount from each application user. The data will be sent from the MS to the SGSN using a suitable LLC structure.

The application status/behavior data or session data is sent using an LLC structure to the SGSN. In-between the SGSN and GGSN internal signaling will be used. From the GGSN the charging info can be sent over the G0 interface with the protocols COPS (Rel 5) and DIAMETER (Rel 6+) to IMS node. In case IMS network entities (i.e. P_CSCF, I-CSCF, S_CSCF, BGCF. MRFC, MGCF, AS) are involved in the session typically the DIAMETER Rf interface to send accounting information to a CCF (Charging Collection Function) or, in case of online charging the ECF (Event Charging Function) is used, located in the same domain. The CCF will collect all this information, and build a CDR (Call Detail Record), which is sent to the Billing System of the domain.

If no IMS is present, the GSN uses the Ga interface to send CDR (accounting records) through the CG (Charging Gateway) to the Billing System.

Using the method and device as described herein will provide the operator of a cellular radio system with information on how a specific service is working in the network. The information can be used for a multitude of different things. It can for example be used to provide a benchmark on the quality of service in the network Furthermore, today, drive tests or walk tests are normally done to ensure good functionality of a service, the method and device as described herein will provide performance of every service for every user and will be continuously monitored and thus avoiding expensive drive tests. In addition, it will enable the operator of a cellular radio network to guarantee good quality to a user. If the quality is not fulfilled, the subscriber of a service can be compensated by not being charged for the service.

The invention claimed is:

1. A method of distributing information relating to a packet switched application run on a mobile station in a cellular radio system, the method comprising:
running the packet switched application on the mobile station, wherein running the packet switched application includes buffering download data received at the mobile station from the cellular radio system in a buffer;
responsive to running the packet switched application on the mobile station, generating a status message in the mobile station, the status message comprising information relating to performance of the packet switched application wherein the status message indicates that the buffer has run empty; and
transmitting the status message to the cellular radio system.

2. The method according to claim 1, where the status message includes information relating to a malfunctioning service.

3. The method according to claim 1, where the status message includes parameters indicative of an end-user experience.

4. The method according to claim 1, wherein transmitting the status message comprises transmitting the status message responsive to ending a session of running the packet switched application on the mobile station.

5. The method according to claim 1, wherein transmitting the status message comprises transmitting the status message responsive to occurrence of a predefined event.

6. The method according to claim 1 wherein the status message includes information relating to a payload of the packet switched application.

7. A method of distributing information relating to a packet switched application run on a mobile station in a cellular radio system, wherein running the packet switched application on the mobile station includes buffering download data received at the mobile station from the cellular radio system in a buffer at the mobile station, the method comprising:
receiving a status message at the cellular radio system from the mobile station, wherein the status message comprises information relating to performance of the packet switched application run on the mobile station and wherein the status message indicates that the buffer has run empty; and
generating a charge for usage of the packet switched application run on the mobile station responsive to the status message.

8. The method according to claim 7 further comprising:
storing the status message in a node connected to the cellular radio system.

9. The method according to claim 7 wherein the status message includes information relating to a payload of the packet switched application.

10. The method according to claim 7, wherein the status message includes information relating to a malfunctioning service.

11. The method according to claim 7, wherein the status message includes parameters indicative of an end-user experience at the mobile station.

12. The method according to claim 7 further comprising:
increasing a bandwidth available for the packet switched application run on the mobile station responsive to the status message indicating that the buffer has run empty.

13. The method according to claim 7 wherein generating the charge comprises lowering the charge for usage of the packet switched application run on the mobile station responsive to the status message indicating that the buffer has run empty.

14. A mobile station comprising:
means for running a packet switched application on the mobile station in a cellular radio system, wherein running the packet switched communication application includes buffering download data received at the mobile station from the cellular radio system in a buffer;
means for generating a status message in the mobile station responsive to running the packet switched application on the mobile station, wherein the status message comprises information relating to performance of the packet switched application, wherein the status message indicates that the buffer has run empty; and
means for transmitting the status message to the cellular radio system.

15. The mobile station according to claim 14, where the status message includes information relating to a malfunctioning service.

16. The mobile station according to claim 14, where the status message includes parameters indicative of an end-user experience.

17. The mobile station according to claim 14, wherein the status message includes information relating to a payload of the packet switched application.

18. A mobile station comprising:
means for running a packet switched application on the mobile station in a cellular radio system, wherein running the packet switched application includes buffering download data received at the mobile station from the cellular radio system in a buffer;
means for generating a status message in the mobile station responsive to running the packet switched application on the mobile station, wherein the status message comprises information relating to performance of the packet switched application wherein the status message indicates that the buffer has run empty; and means for transmitting the status message to the cellular radio system.

19. The mobile station according to claim 18, wherein the means for transmitting comprises means for transmitting the status message responsive to ending a session of running the packet switched application on the mobile station.

20. The mobile station according to claim 18, wherein the means for transmitting the status message comprises means for transmitting the status message responsive to occurrence of a predefined event.

21. The mobile station according to claim 18 wherein the status message includes information relating to a payload of the packet switched application.

22. The mobile station according to claim 14 wherein the means for transmitting the status message comprises means for transmitting the status message to the cellular radio system responsive to ending a session of running the packet switched application on the mobile station.

23. A method of distributing information relating to a packet switched application run on a mobile station in a cellular radio system wherein running the packet switched application on the mobile station includes buffering download data received at the mobile station from the cellular radio system in a buffer at the mobile station, the method comprising:

receiving a status message at the cellular radio system from the mobile station, wherein the status message comprises information relating to performance of the packet switched application run on the mobile station, and wherein the status message indicates that the buffer has run empty.

24. The method according to claim 23, wherein the status message includes parameters indicative of an end-user experience at the mobile station.

25. The method according to claim 23 further comprising:

increasing a bandwidth available for the packet switched application run on the mobile station responsive to the status message indicating that the buffer has run empty.

* * * * *